United States Patent
Liu et al.

(10) Patent No.: US 8,630,306 B2
(45) Date of Patent: Jan. 14, 2014

(54) FAST CHANNEL CHANGE APPARATUS AND METHOD FOR IPTV

(75) Inventors: Guangtian Liu, Cedar Park, TX (US); Weijing Chen, Leander, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 381 days.

(21) Appl. No.: 11/327,929

(22) Filed: Jan. 9, 2006

(65) Prior Publication Data
US 2007/0160038 A1 Jul. 12, 2007

(51) Int. Cl.
*H04L 12/54* (2013.01)
(52) U.S. Cl.
USPC ............. 370/428; 375/240.01; 375/240.27; 725/38; 370/546; 370/486
(58) Field of Classification Search
USPC .......... 370/389, 468, 428, 486, 546; 725/38, 725/135; 375/240.01–240.03, 375/240.12–240.16, 240.26, 240.27
See application file for complete search history.

(56) References Cited

U.S. PATENT DOCUMENTS

| | | | |
|---|---|---|---|
| 5,434,852 A | 7/1995 | La Porta et al. | |
| 5,440,334 A | 8/1995 | Walters et al. | |
| 5,477,263 A | 12/1995 | O'Callaghan et al. | |
| 5,481,542 A | 1/1996 | Logston et al. | |
| 5,506,615 A | 4/1996 | Awaji | |
| 5,513,180 A | 4/1996 | Miyake et al. | |
| 5,757,798 A | 5/1998 | Hamaguchi | |
| 6,011,805 A * | 1/2000 | Esteve et al. | 370/468 |
| 6,044,403 A | 3/2000 | Gerszberg et al. | |
| 6,118,498 A * | 9/2000 | Reitmeier | 348/725 |
| 6,369,855 B1 | 4/2002 | Chauvel et al. | |
| 6,522,668 B1 | 2/2003 | Singleton et al. | |
| 6,728,965 B1 * | 4/2004 | Mao | 725/38 |
| 6,763,019 B2 | 7/2004 | Mehta et al. | |
| 6,806,909 B1 | 10/2004 | Radha et al. | |
| 6,850,691 B1 * | 2/2005 | Stam et al. | 386/68 |
| 6,959,372 B1 * | 10/2005 | Hobson et al. | 711/168 |
| 2001/0019559 A1 | 9/2001 | Handler et al. | |
| 2002/0016831 A1 | 2/2002 | Peled et al. | |
| 2003/0167472 A1 * | 9/2003 | Barbanson et al. | 725/131 |
| 2004/0128317 A1 * | 7/2004 | Sull et al. | 707/104.1 |
| 2005/0081244 A1 * | 4/2005 | Barrett et al. | 725/97 |
| 2005/0207449 A1 * | 9/2005 | Zhang et al. | 370/486 |
| 2005/0283547 A1 * | 12/2005 | Parry et al. | 710/52 |
| 2006/0075428 A1 * | 4/2006 | Farmer et al. | 725/38 |
| 2006/0195881 A1 * | 8/2006 | Segev et al. | 725/116 |
| 2007/0002946 A1 * | 1/2007 | Bouton et al. | 375/240.01 |
| 2007/0061831 A1 * | 3/2007 | Savoor et al. | 725/13 |
| 2007/0088971 A1 * | 4/2007 | Walker et al. | 714/4 |
| 2007/0140647 A1 * | 6/2007 | Kusunoki et al. | 386/68 |
| 2007/0143816 A1 * | 6/2007 | Gupta et al. | 725/135 |
| 2007/0234395 A1 * | 10/2007 | Dureau et al. | 725/135 |

OTHER PUBLICATIONS

PCT International Search Report and Written Opinion of the International Searching Authority dated Oct. 29, 2007.

* cited by examiner

*Primary Examiner* — Man Phan
*Assistant Examiner* — Mandish Randhawa
(74) *Attorney, Agent, or Firm* — Jackson Walker L.L.P.

(57) ABSTRACT

The present disclosure provides a system that can receive a group of channels (at least one of which includes an I-frame) from a DSL network, a memory that can store the I-frames, and a channel change detector that can detect a user's selection of a particular channel. If the memory contains the I-frame corresponding to the particular channel and if an I-frame has not been received from the DSL network, then the system provides the stored I-frame from the memory to the user.

12 Claims, 5 Drawing Sheets

FAST CHANNEL CHANGE APPARATUS AND METHOD FOR IPTV

BACKGROUND OF THE DISCLOSURE

1. Field of the Disclosure

The present disclosure relates to the field of switched-network services.

2. Background

Switched-networks, such as digital subscriber line (DSL) networks, are used to provide services, such as Internet access, Internet Protocol Television (IPTV), Video-on-Demand (VoD), Voice over Internet (VoIP), etc. A typical DSL network includes various servers and routers that form a backbone for the DSL network. These servers receive, among other things, DSL content (such as video, voice and data) from various sources and transmit the DSL content to central offices (COs) located in different geographical areas. Switches, such as Digital Subscriber Line Access Multiplexers (DSLAMs), distribute the DSL content to customer equipment, and establish two-way communication between the network and the customer equipment. A DSLAM typically contains multiple (a few hundred) ports, each providing a dedicated connection to a subscriber or customer interface equipment, such as a modem (also referred to herein as the customer gateway).

In a switched IPTV network, each channel of IPTV service is associated with an IP multicast group and delivered to a customer as an IP multicast stream. A customer typically selects to watch a channel by using a set-top-box (STB) that sends a "JOIN" message to the network, requesting to join the corresponding IP multicast group. Upon receiving such a "JOIN" request, the network starts sending the associated multicast stream to the customer's STB.

Typically, a video stream consists of a sequence of different types of frames that includes the video and voice contents. These frames are referred to as I-frame, B-frame and P-frame. I-frame, which stands for index frame, is a frame that is used as a reference to predict and encode other frames, such as B-frames or P-frames, which follow the I-frame. An I-frame and the B-frames and P-frames that follow the I-until frame (until the next I-frame) is often called a group of pictures (GOP). The distance between I-frames in a video stream typically ranges from 0.3-5 seconds, depending on the encoding schemes and video contents. Thus, when a customer changes to a channel between I-frames, the customer may have to wait for as long as 5 seconds until the next I-frame arrives from a video server to see a clear picture. Thus, there is a need for system and method that can provide the video content faster to the customers.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein.

DETAILED DESCRIPTION OF THE DISCLOSURE

In view of the above, the present disclosure through one or more of its various aspects and/or embodiments is presented to provide one or more advantages, such as those noted below.

The present disclosure, in one aspect, provides a computer program embedded in a computer readable medium that contains instructions operative to be executed by a processor. The computer program includes at least one instruction operative to cause the processor to buffer an I-frame sent from a server to a user; at least one instruction operative to cause the processor to detect a user event from the user; and at least one instruction operative to cause the processor to provide the I-frame to the user in response to the user event. The computer program may further include at least one instruction operative to cause the processor to buffer an I-frame for each channel in a group of channels, the group of channels being at least one of: all channels available in the network, all channels subscribed by a group of customers or a neighborhood, all channels that are frequently watched by the neighborhood, and predicted channels based upon at least one of user viewing patterns, neighborhood viewing patterns, network viewing patterns, time of day, day of week, and programming schedules. The computer program also may include at least one instruction operative to cause the processor to circularly FIFO buffer a most recent I-frame for each channel of the group of channels, and at least one instruction operative to cause the processor to share the I-frame with another processor of a processor cluster. The user event may be a channel change or a user device error.

The present disclosure further provides a method for providing video content, the method comprising buffering an I-frame transmitted over a network in a network device; detecting a user event from a user; and providing the buffered I-frame to the user in response to the user event. The method further may comprise buffering an I-frame for each channel in a group of channels, the group of channels being at least one of: all channels available in the network, all channels to which a neighborhood is subscribed, all channels that are frequently watched by the neighborhood, and all predicted channels (predicting a next channel based upon at least one of user viewing patterns, neighborhood viewing patterns, network viewing patterns, time of day, day of week, and programming schedules). The buffering includes buffering a most recent I-frame for each channel from a group of channels.

The present disclosure also provides a network element that is operative to provide content to a user in a network. The network element includes a memory operative to store an I-frame of the content; a user event detector that is operative to detect a user event from the user; and a processor operative to buffer an I-frame in the memory, and further operative to provide the I-frame from the memory to the user in response to the user event. The memory of the network element may be further operative to store an I-frame of the content for each channel in a group of channels, the group of channels including the desired channel and being at least one of: all channels available in the network, all channels to which a neighborhood is subscribed, all channels that are frequently watched by the neighborhood, and all predicted channels (predicting a next channel based upon at least one of user viewing patterns, neighborhood viewing patterns, network viewing patterns, time of day, day of week, and programming schedules). The memory may be a circular FIFO buffer and may be accessible by another processor of a processor cluster.

Figure 1:
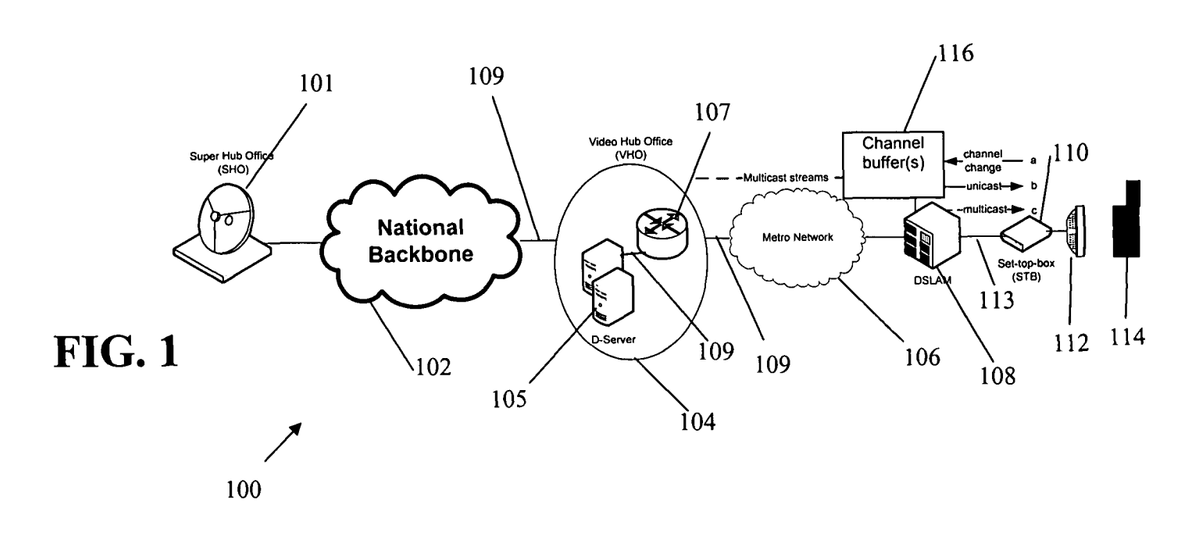
FIG. 1 is a representation of a switched Internet Protocol Television (IPTV) network, or ITPV Service Architecture, in accordance with an embodiment of the present disclosure.

FIG. 1 is a representation of a switched Internet Protocol Television (IPTV) network, or ITPV Service Architecture 100, in accordance with an embodiment of the present disclosure. IPTV uses a two-way digital broadcast signal sent through a switched network by way of a broadband connection and a set-top box (STB). The STB is programmed with software that can forward viewer requests (for example, a command sent by using a television remote) to a server, such as a video server (SVS) in the network, which can provide access to many available media sources (e.g. broadcast network channels, subscription services, and video-on-demand). Though there are many possible media sources, only one video channel is described for ease of understanding.

The IPTV network of FIG. 1 may be implemented using broadband services based on any digital subscriber line (DSL) technology. There are various types of DSL technologies, such as asymmetric DSL, high bit-rate DSL, single-line DSL, very-high-data-rate DSL, integrated services digital network DSL, and rate-adaptive DSL having various transmission rates, switched circuit characteristics, and other known operation characteristics. These are collectively referred to herein as xDSL technologies. DSL services offer users high digital data rates over telephony transmission facilities. The transmission facilities or links that connect customer premises equipment to the network are commonly known as the "loop" and include two wires twisted together.

As shown in FIG. 1, the switched IPTV network 100 includes carrier-side access devices which as referred to as switched DSL Access Multiplexers (DSLAMs) 108. DSLAMs 108 perform traffic aggregation, grooming, policing, access multiplexing and other tasks. Through DSLAMs, the network 100 is able to communicate with dedicated information sources and with the Internet. As a result, information accessible to the backbone network 102 may be communicated between network 100 and the customer site device, such as a STB or modem 110. In one aspect of this disclosure, the switched IPTV network may be said to operate in a Digital Subscriber Line Access Multiplexer (DSLAM) environment.

As shown in FIG. 1, the system 100 (or the IPTV Service Architecture 100) includes a super hub office (SHO) 101, a national backbone 102, a video hub office 104, a metronetwork 106, a DSLAM 108, a channel buffer device 116 and a customer gateway or set top box 110. The SHO 101 may include a variety of sewers that obtain a variety of content (video, voice data) and provide to other servers and routers in the national backbone 102. VHO 104 may be part of the national backbone or may be located in various geographical areas and includes servers 105, router 107, and transport links 109. Metronetworks (also sometimes referred to as central offices) provide connectivity through DSLAMs between the VHOs on the network and the customer gateway 110 on the client site. The channel buffer device 116 may further include memory for buffering data streams including I-frames, programs or instructions that detect channel changes received via a client premise equipment, such as STB 110, a processor and computer programs or instructions that provide the stored I-frame to the DSLAM in response to a customer event, such as a change of a channel. It should be noted that the functions of the channel buffer device 116 may be integrated into a DSLAM or any other suitable device that interfaces with the customer gateway. The customer side also is shown to include a viewing device 112 and a remote 114 device that is used to change channels.

The switched IPTV network 100 may be used to distribute video signals, including compressed video signals. Video compression may be implemented through I-frames, P-frames, and B-frames. I-frames, or "inframes," (also known as "key frames" or "index frames") are independently decodable, and store all the data required to display a frame. The I-frame is used as a reference to predict and encode B-frames or P-frames that follow the I-frame.

Still referring to FIG. 1, P-frames, or "predicted" frames, are predicted from a previous I-frame or P-frame, and contain information needed to recreate a video frame in conjunction with the information in the previous I-frame. B-frames, or "bi-directional" frames, describe motion vectors of discrete shapes within the image, between one past I-frame or P-frame and/or one future I-frame or P-frame. Any future frame on which a B-frame depends is provided before the B-frame, but presented after the B-frame, but if the motion vector is constant, moving images may be accurately presented even though I-frames may be infrequent. Also "sync" frames and use frame reordering may be used. H.263 and H.264 codecs, for example, within an STB can present video based on the I-frames, B-frames, and P-frames.

A particular I-frame and the B-frames and P-frames that follow the I-frame, until the next I-frame is received, is often called a group of pictures (GOP). Typically the distance between I-frames in a video stream ranges from 0.3-5 seconds, depending on the encoding schemes and video contents. When a viewer changes to a channel between I-frames, even if the network can start sending the corresponding video stream to his/her STB immediately, he/she may still have to wait for as long as 5 seconds until the next I-frame to see a clear picture. However, the channel change time for typical TV services is between 0.5-2 seconds.

In the present disclosure, the channel buffer device 116 may receive and buffer the latest frames for a channel up to the most recent "N" I-frames, where N may be as small as 1. In the IPTV mode, the DSLAM 108 receives a group of channels. The DSLAM 108 may join a group of channels, such as all multicast groups for all channels. The channel frame buffers 116 may accordingly store frame data up to the most recent "N" I-frames for each channel in a group of channels or a group of frequently watched channels. Alternatively, the channel frame buffers 116 may store and buffer a most recent I-frame for each channel in the group of channels.

Still referring to FIG. 1, in one aspect, the DSLAM 108 may adopt a hashing mechanism to select a subgroup of all channels. The hashing mechanism may be, for example, viewing frequency based hashing, to decide which multicast groups (channels) to join and buffer. The channel frame buffer 116 may accordingly store an I-frame for each channel to which at least one user coupled to the DSLAM 108 is currently subscribed, and/or an I-frame for each channel to which at least one user coupled to the DSLAM 108 may become subscribed. The memory of the channel frame buffer 116 may utilize any suitable storing scheme, including a circular memory buffer, such as a circular first in, first out (FIFO) buffer, that can store a most recent I-frame for each channel of the group of channels, and delete an oldest I-frame for each channel of the group of channels in response to a full status.

In another aspect, the DSLAM 108 may also predict a next channel based upon each user's viewing patterns, neighborhood viewing patterns, network viewing patterns, time of day, day of week, and/or programming schedules. For example, if a programming schedule indicates that a popular event will be televised at a particular time, the DSLAM 108 may adapt a hashing mechanism to include the popular event, even if no user is currently watching any channel that will televise the popular event. The hashing mechanism may be adapted to determine a user habit, such as whether a particular user prefers to watch comedies, sporting events, or musical performances and may include customized buffering in the memory.

As shown in FIG. 1, in another aspect, the DSLAM 108 may also include a dedicated user channel corresponding to each user equipment that is coupled to the DSLAM 108. The DSLAM 108 may provide I-frames, B-frames, and/or P-frames to each user. So long as the user does not change channels, the DSLAM 108 continues to provide the received signals from the backbone, including I-frames, B-frames, and/or P-frames to each user. Periodically, the DSLAM 108 receives I-frames from a video server and passes the I-frames on to the user. Between I-frames, the DSLAM 108 typically receives P-frames and/or B-frames, and passes the P-frames and/or a B-frames on to the user. Each channel periodically provides an I-frame, and (in between I-frames) each channel provides B-frames and/or P-frames. The DSLAM 108 may provide the unicast signal that may contain at least one of a modified P-frame and a modified B-frame.

Users typically frequently change channels. The channel change detector of channel charge buffer 116 detects a user's selection of a particular channel by intercepting a channel change request from the STB 110. If a user changes to a particular channel after the channel has provided an I-frame, the DSLAM 108 retrieves an I-frame from the memory of the channel change buffer and provides that I-frame to the STB 110. Accordingly, the STB 110 is able to reconstruct a full image from subsequently provided B-frames and/or P-frames.

In response to the channel change request, the DSLAM 108 may send the channel's buffered frames, from the most recent I-frame to the last buffered frame, to the STB via unicast at a faster pace than the multicast frame rate. If desired, the DSLAM 108 may calculate a modified I-frame based upon a stored I-frame and a received P-frame and/or B-frame. The modified I-frame may replace the stored I-frame in the memory. When a user changes channels to a particular channel corresponding to the modified I-frame, the DSLAM 108 may provided the modified I-frame to the STB of the user. The DSLAM 108 may provide a unicast signal containing at least one of a modified P-frame and a modified B-frame.

In the switched IPTV network, or IPTV Service Architecture 100, each channel of IPTV service may be associated with an IP multicast group and delivered to a viewer as an IP multicast stream. A viewer may select to watch a channel by using the STB to send a "JOIN" message to the network, requesting to join the corresponding IP multicast group. Upon receiving such a "JOIN" request, the network may start sending the associated multicast stream to the viewer's STB.

The DSLAM 108 may continue to provide a unicast signal based upon the I-frame from memory, or may switch to provide a multicast signal that the DSLAM 108 receives from a server further upstream. The DSLAM 108 may then start to sending multicast instead of unicast stream to the STB when it determines that unicast and multicast streams are in sync. Specifically, the DSLAM 108 may switch to the multicast signal upon determining that the unicast signal and the multicast signals are in aync. The DSLAM 108 may determine that the unicast and multicast streams are in sync when, for example, the DSLAM 108 has sent the last buffered frame to the STB via unicast. The DSLAM 108 may also determine that the unicast and multicast streams are in sync when, for example, a new I-frame has just been received via multicast. Other situations may also allow the DSLAM 108 to determine that the unicast and multicast streams are in sync.

The DSLAM 108 may compare the I-frame stored in the memory with a received version of the particular channel, and may switch to the received version of the particular channel in response to a determination that the received version and the unicast signal are synchronized. For example, the DSLAM 108 may switch to the received version of the particular channel in response to a determination that the received version contains an I-frame. In response to a determination that the unicast and multicast streams are in sync, the DSLAM 108 may start sending multicast stream from the I-frame, which may sometimes result in jump-ahead to viewer experience.

In accordance with another embodiment of the present disclosure, the DSL network may also include a cluster memory coupled to at least two DSLAM 108s. The cluster memory may store an I-frame such that each DSLAM 108 coupled to the cluster memory may retrieve an I-frame from the cluster memory in response to the channel change detector. Accordingly I-frames corresponding to rarely-viewed channels may be stored in the cluster memory rather than in any particular DSLAM 108. The cluster memory may be better able than a server at the central office to provide an I-frame quickly to any DSLAM 108 coupled to the cluster memory.

In accordance with another embodiment of the present disclosure, the DSL environment may also include a coprocessor coupled to the DSLAM 108. The coprocessor may be able to create a modified I-frame from an I-frame and any P-frames and B-frames that may have been received since the I-frame. The coprocessor may insert the modified I-frame into the memory such that if a user changes channels, the user may be provided with a modified I-frame. The modified I-frame need not be available to any other DSLAM 108 within the DSL network.

The described embodiment may include any type of server that provides fast channel change (FCC) for less frequently viewed channel including servers referred to as the "channel change servers". The described embodiment may implement the proposed FCC method in a separate platform and integrating it into a DSLAM 108 locally or via LAN.

The functions and operations described may be implemented in the server located in the network 100 which may be a separate platform that interacts with other components, such as DSLAMs. Thus, it is a flexible system that can be implemented anywhere in the network 100.

Still referring to FIG. 1, the described embodiment of the present invention may be used to reduce a risk of metro network congestion, particularly if many viewers change channels within a short time frame, since some multicast streams may be provided from the DSLAM rather than from one of the servers 105 as a channel change server, which is deployed deep in the network in the VHO 104 and which might otherwise have to provide a unicast stream to the STB 110. The unicast video streams from the DSLAM may be assigned any priority with only slight burden on the Quality of Service (QoS) of the IPTV network, since the unicast video stream from the DSLAM is provided only on a portion of the IPTV network between the DSLAM and the STB. Scalability of the channel change servers may also be preserved and enhanced, possibly reducing to a minimum number of channel change servers required to provide adequate service.

Figure 2:
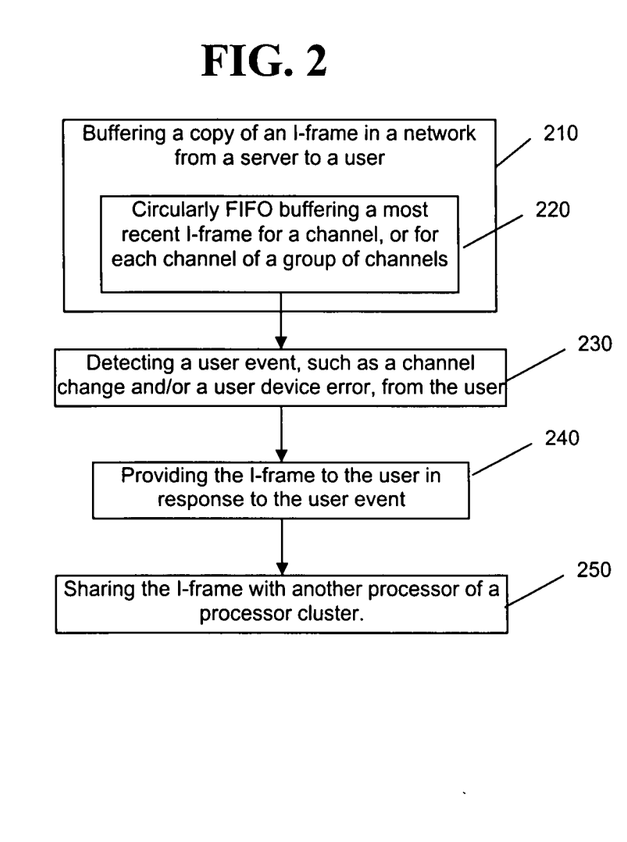
FIG. 2 is a flowchart depicting a method for providing video content, in accordance with an embodiment of the present invention.

FIG. 2 is a flowchart depicting a method for providing video content, in accordance with an embodiment of the present invention. The method may include buffering 210 an I-frame in a network from a server to a user, possibly including circularly FIFO buffering 220 a most recent I-frame for a channel, or for each channel of a group of channels. The group of channels may include all channels available in the network, or all channels to which a neighborhood is subscribed, or all channels that are frequently watched by the neighborhood, or all predicted channels. The group of predicted channels may be created by predicting a next channel based upon at least one of user viewing patterns, neighborhood viewing patterns, network viewing patterns, time of day, day of week, and programming schedules.

The method may include detecting 230 a user event, such as a channel change and/or a user device error, from the user. Finally, the method may include providing 240 the I-frame to the user in response to the user event. If desired, the method may also include sharing 250 the I-frame with another processor of a processor cluster.

Figure 3:
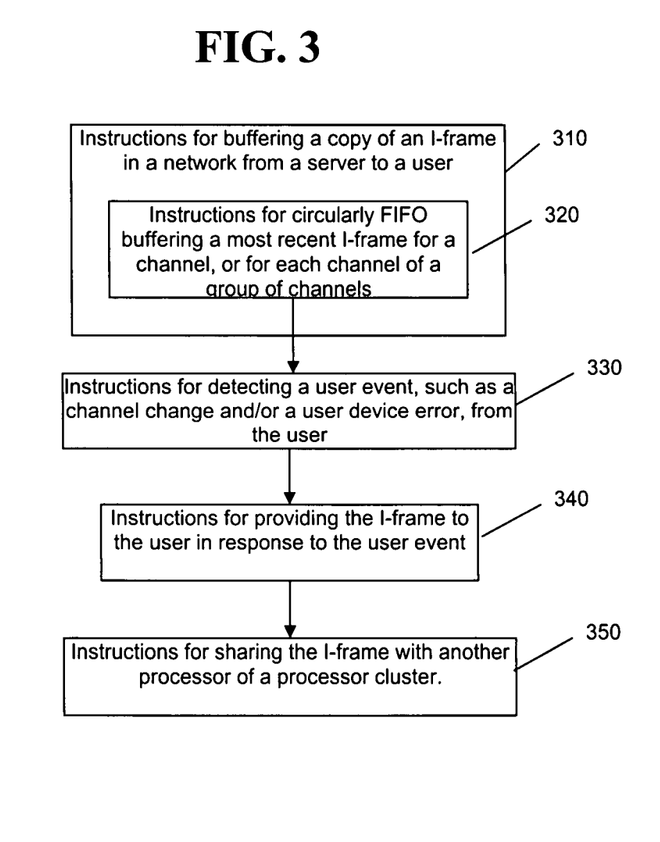
FIG. 3 is a representation of a computer readable medium containing instructions operative to be executed in a computer containing a processor, in accordance with an embodiment of the present invention.

FIG. 3 is a representation of a computer readable medium containing instructions operative to be executed in a computer containing a processor, in accordance with an embodiment of the present invention. The instructions may include, for example, at least one instruction 310 that can cause the processor to buffer an I-frame in a network from a server to a user, possibly including at least one instruction 320 that can cause the processor to circularly FIFO buffer a most recent I-frame for each channel of the group of channels. The instructions may also include at least one instruction that can cause the processor to buffer an I-frame for each channel in a group of channels. The group of channels may include all channels available in the network, or all channels to which a neighborhood is subscribed, or all channels that are frequently watched by the neighborhood, or all predicted channels. The group of predicted channels may be created by predicting a next channel based upon at least one of user viewing patterns, neighborhood viewing patterns, network viewing patterns, time of day, day of week, and programming schedules.

The instructions may include at least one instruction 330 that can cause the processor to detect a user event, such as a channel change and/or user device error, from the user. Finally, the instructions may include at least one instruction 340 that can cause the processor to provide the I-frame to the user in response to the user event. The instructions may also include at least one instruction that can cause the processor to share 350 the I-frame with another processor of a processor cluster.

Figure 4:
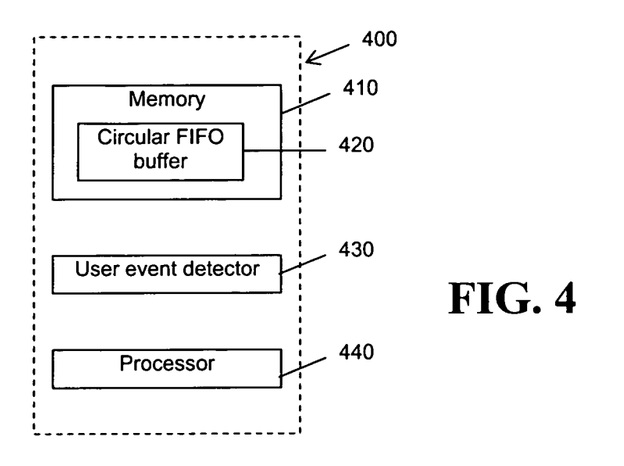
FIG. 4 is a representation of a network element that can provide content to a user in a network, in accordance with an embodiment of the present invention.

FIG. 4 is a representation of a network element that can provide content to a user in a network, in accordance with an embodiment of the present invention. The network element may include a memory 410, such as a circular FIFO buffer 420, that can store an I-frame of the content. The network element may include a user event detector 430 that can detect a user event, such as a channel change and/or a user device error, from the user. Also, the network element may include a processor 440 that can buffer an I-frame in the memory, that can provide the I-frame from the memory to the user in response to the user event.

The processor 440 may be able to determine a desired channel in response to the user event, and the memory may be able to store an I-frame of the content for each channel in a group of channels, such that the group of channels may include the desired channel. The group of channels may include all channels available in the network, or all channels to which a neighborhood is subscribed, or all channels that are frequently watched by the neighborhood, or all predicted channels. Predicting a next channel may be based upon at least one of the following: user viewing patterns, neighborhood viewing patterns, network viewing patterns, time of day, day of week, and programming schedules. If desired, the memory may be accessible by another processor of a processor cluster. The processor 440 may reside within a DSLAM of a switched IPTV network, or an IPTV Service Architecture.

Figure 5:
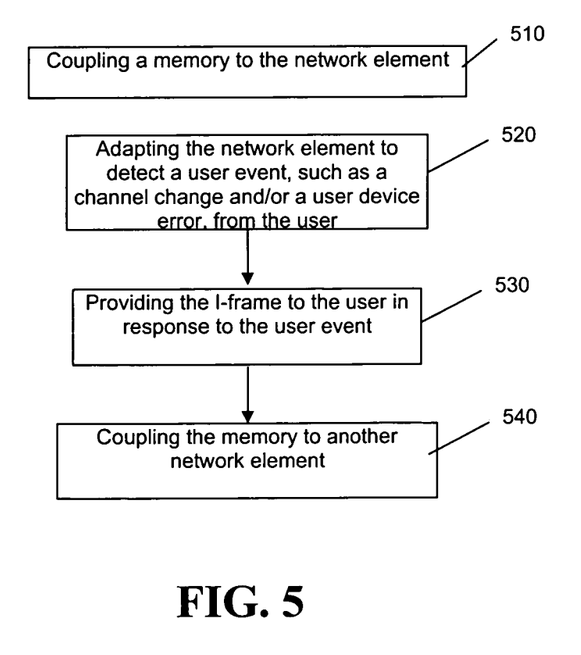
FIG. 5 is a flowchart depicting a method for modifying a network element, in accordance with an embodiment of the present invention.

FIG. 5 is a flowchart depicting a method for modifying a network element, in accordance with an embodiment of the present invention. The method may include coupling a memory 510, such as a circular FIFO buffer that can buffer a most recent I-frame for a desired channel or for each channel of the group of channels, to the network element such that the memory can buffer an I-frame in a network from a server to a user. The method may include adapting 520 the network element to detect a user event, such as a channel change and/or a user device error, from the user. Finally, the method may include providing 530 the I-frame to the user in response to the user event.

The coupling 510 may allow the memory to buffer an I-frame for each channel in a group of channels, including a desired channel. The group of channels may include all channels available in the network, or all channels to which a neighborhood is subscribed, or all channels that are frequently watched by the neighborhood, or all predicted channels. Predicted channels may be determined based upon at least one of the following: user viewing patterns, neighborhood viewing patterns, network viewing patterns, time of day, day of week, and programming schedules. The method may also include coupling 540 the memory to another network element.

Figure 6:
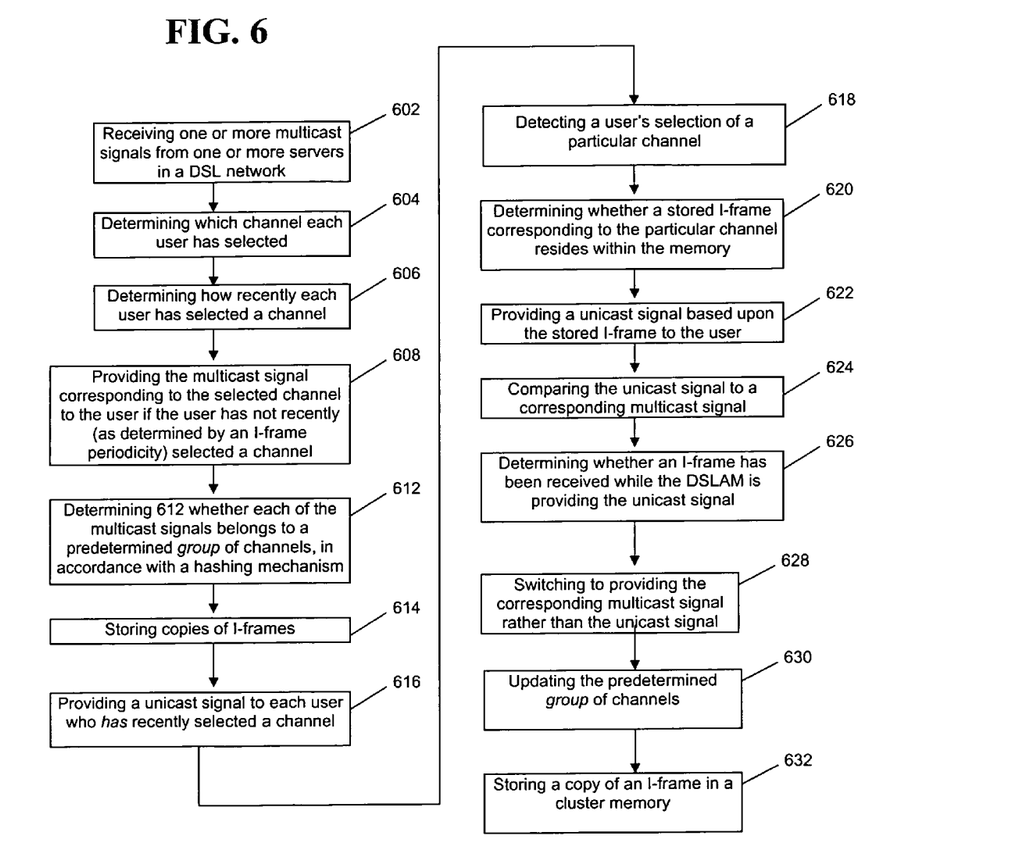
FIG. 6 is a flowchart of a method for providing content to a user in a network, in accordance with yet another embodiment of the present disclosure.

FIG. 6 is a flowchart of a method for providing content to a user in a network, in accordance with yet another embodiment of the present disclosure. The method may include receiving 602 one or more multicast signals from one or more servers in a DSL network. At least one of the multicast signals may include an I-frame. The method may also include determining which channel each user has selected 604, and how recently each user has selected a channel 606. The method may also include providing the multicast signal corresponding to the selected channel 608 to each user who has not recently (as determined by an I-frame periodicity) selected a channel.

The method may also include determining 612 whether each of the multicast signals belongs to a predetermined group of channels, in accordance with a hashing mechanism. The predetermined group of channels may be defined in accordance with user viewing patterns, neighborhood viewing patterns, network viewing patterns, time of day, day of week, and/or programming schedules, and may include channels that are frequently watched, channels to which at least one user is currently subscribed, or channels to which at least one user may become subscribed.

For each of the multicast signals of the predetermined group of channels, the method may also store copies of I-frames 614, and may avoid storing copies of B-frames and P-frames. Since any of the multicast signals (including those which belong to the predetermined group of channels) may contain I-frames, some I-frames may be stored. Specifically, the method may include circular FIFO buffering, i.e. storing a most recent I-frame and, in response to a full status, deleting an oldest I-frame corresponding to each multicast signal of the predetermined group of channels.

As indicated above, the method may include providing the multicast signal corresponding to the selected channel to each user who has not selected a channel within a predetermined period of time (since the most recent I-frame from the IPTV network). However, the method may also include providing a unicast signal to each user who has recently selected a channel 616.

The method may also include detecting a user's selection of a particular channel 618. In response to the detecting the user's selection of a particular channel 618, the method may include determining whether a stored I-frame corresponding to the particular channel resides within the memory 620. If an I-frame corresponding to the particular channel resides within the memory, the method may include providing a unicast signal based upon the stored I-frame to the user 622. The unicast signal may include the I-frame, or may include a modified I-frame that has been updated in accordance with P-frames and B-frames received since the I-frame was received.

The method may also include comparing the unicast signal to a corresponding multicast signal 624 to determine whether the unicast signal is in sync with the multicast signal, and may include determining whether an I-frame has been received while the DSLAM is providing the unicast signal 626. If the unicast signal is in sync with the multicast signal, or if an I-frame has been received while the DSLAM is providing the unicast signal (or both), the method may include switching to providing the corresponding multicast signal rather than the unicast signal 628.

The method may also include updating the predetermined group of channels 630, in accordance with a hashing mechanism. For example, if the predetermined group of channels is defined to include most-frequently watched channels, then the predetermined group of channels may be updated should the users begin to watch theretofore unwatched channels. The method may also include storing an I-frame in a cluster memory 632 such that more than one processor coupled to the cluster memory may retrieve an I-frame from the cluster memory in response to the channel change detector at a user corresponding to the processor.

Figure 7:
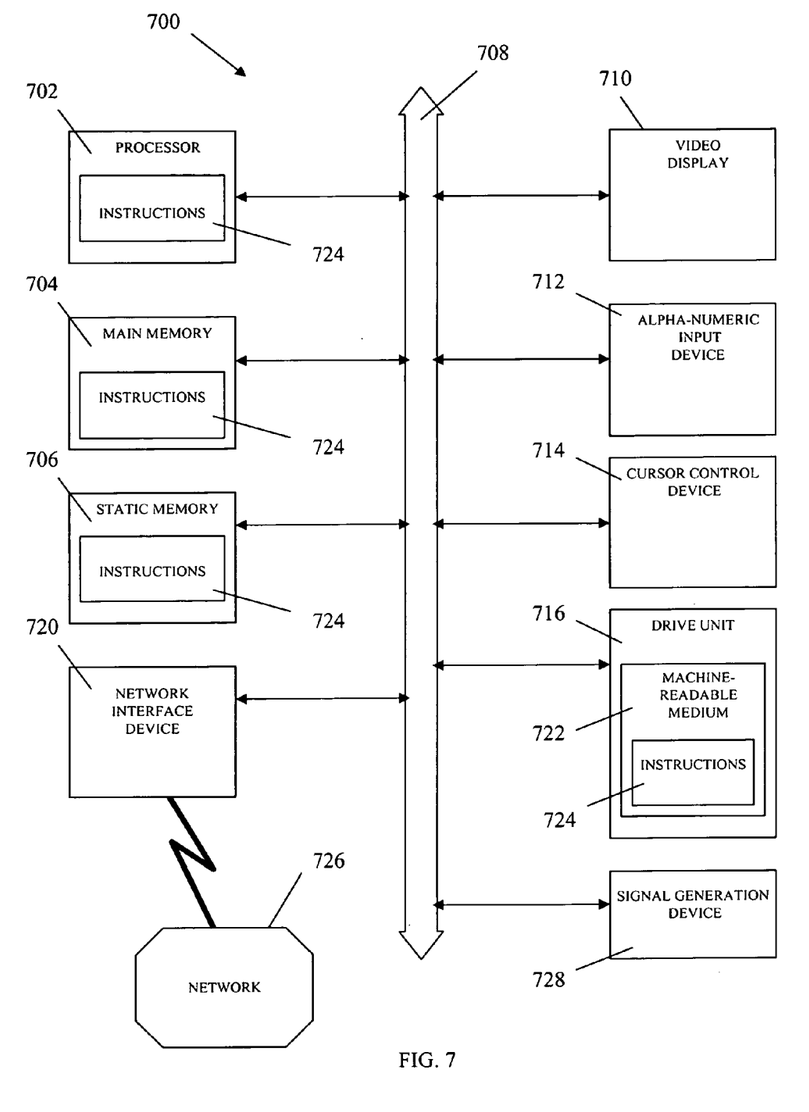
FIG. 7 is a diagrammatic representation of a machine in the form of a computer system within which a set of instructions, when executed, may cause the machine to perform any one or more of the methodologies discussed herein.

FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

It will be understood that the foregoing description is merely an example of the disclosure, which is not limited by such description, but rather by the claims and their equivalents. The scope of the disclosure herein also includes any novel feature or any novel combination of features disclosed either explicitly or implicitly or any generalization or modification thereof which would be apparent to persons skilled in the relevant art, and any and all legal equivalents thereof, whether or not such relates to the same disclosure as presently claimed in any claim and whether or not it mitigates any or all of the same technical problems as confronted by the present disclosure. The teachings of the foregoing disclosure will suggest other modifications to those persons skilled in the relevant art, including some modifications that may involve other features which are already known and which may be used instead of or in addition to features already described herein. The applicants hereby reserve the right to formulate new claims to such features and/or combinations of such features during the prosecution of the present application or of any further application derived there from.

What is claimed is:

1. A non-transitory computer readable medium including processor executable program instructions that, when executed by the processor, cause the processor to perform operations comprising:
   responsive to receiving B-frames, P-frames, and I-frames, including a first selected I-frame, for a plurality of channels in a first group of channels sent from a server to a user, buffering the first selected I-frame in a buffer of a digital subscriber line access multiplexer;

modifying the first selected I-frame based on subsequently received B-frames and P-frames to produce a modified I-frame;

replacing the first selected I-frame in the buffer with the modified I-frame;

responsive to receiving B-frames, P-frames, and I-frames for a second plurality of channels sent from a server to a user, storing a second selected I-frame in a cluster memory shared by at least two digital subscriber line access multiplexers;

detecting a user event from the user; and providing the modified I-frame to the user in response to the user event.

2. The non-transitory computer readable medium of claim 1, wherein the operations comprise:

circularly FIFO buffering a most recent I-frame for each channel of the first group of channels.

3. The non-transitory computer readable medium of claim 1, wherein the operations include:

sharing the modified I-frame with another processor of a processor cluster.

4. The non-transitory computer readable medium of claim 1, wherein detecting the user event includes at least one of:

detecting a channel change from the users; and detecting a user device error.

5. A method for providing video content, the method comprising:

responsive to receiving B-frames, P-frames, and I-frames, including a first selected I-frame, for a plurality of channels in a first group of channels sent from a server to a user, buffering the first selected I-frame in a buffer of a digital subscriber line access multiplexer;

modifying the first selected I-frame based on subsequently received B-frames and P-frames to produce a modified I-frame;

replacing the first selected I-frame in the buffer with the modified I-frame;

responsive to receiving B-frames, P-frames, and I-frames for a second plurality of channels sent from a server to a user, storing a second selected I-frame in a cluster memory shared by at least two digital subscriber line access multiplexers;

detecting a user event from the user; and providing the modified I-frame to the user in response to the user event.

6. The method of claim 5, further comprising:

circularly FIFO buffering a most recent I-frame for each channel of the first group of channels.

7. The method of claim 5, further comprising:

sharing the modified I-frame with another processor of a processor cluster.

8. The method of claim 5, wherein detecting the user event includes at least one of:

detecting a channel change from the user; and detecting a user device error.

9. A network element for providing content to a user, the network element comprising:

a processor;

a memory, accessible to the processor, including processor executable instructions, that, when executed by the processor, cause the processor to perform operations comprising:

responding to receiving B-frames, P-frames, and I-frames, including a first selected I-frame, for a plurality of channels in a first group of channels sent from a server to a user by buffering the first selected I-frame in a digital subscriber line access multiplexer buffer;

modifying the first selected I-frame based on subsequently received B-frames and P-frames to produce a modified I-frame;

replacing the first selected I-frame in the buffer with the modified I-frame;

responding to receiving B-frames, P-frames, and I-frames for a second plurality of channels sent from a server to a user by storing a second selected I-frame in a cluster memory shared by at least two digital subscriber line access multiplexers;

detecting a user event from the user; and providing the modified I-frame to the user in response to the user event.

10. The network element of claim 9, wherein the operations include:

circularly FIFO buffering a most recent I-frame for each channel of the first group of channels.

11. The network element of claim 9, wherein the operations include:

sharing the modified I-frame with another processor of a processor cluster.

12. The network element of claim 9, wherein detecting the user event includes at least one of:

detecting a channel change from the user; and detecting a user device error.

\* \* \* \* \*